July 5, 1966 D. B. HORTON 3,259,087
FERTILIZER APPLICATOR BLADE
Filed Jan. 27, 1964 5 Sheets-Sheet 1
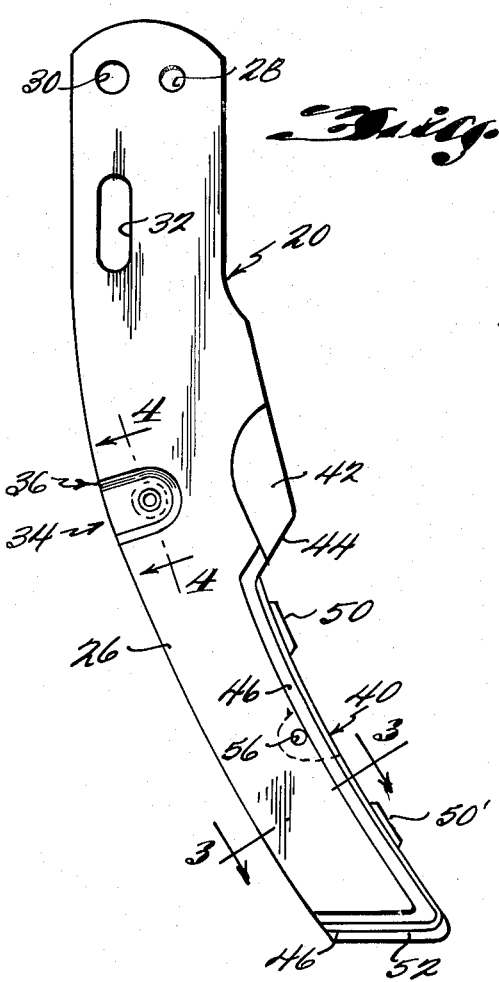
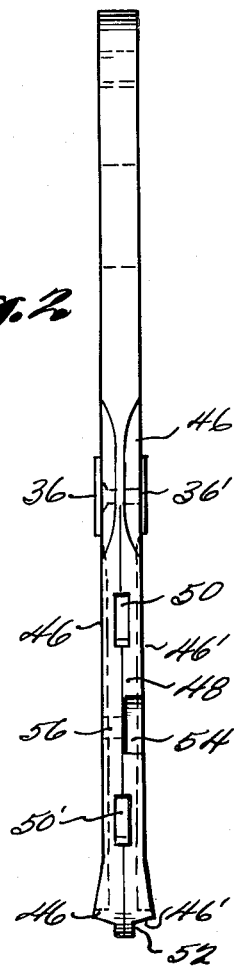
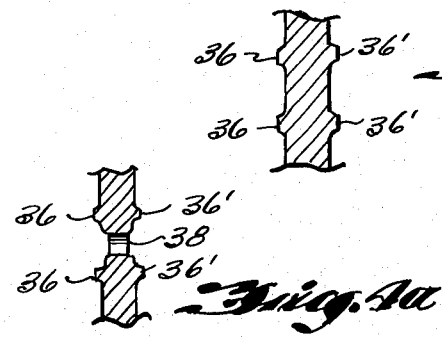
INVENTOR
DONELSON B. HORTON
BY Cushman, Darby & Cushman
ATTORNEYS

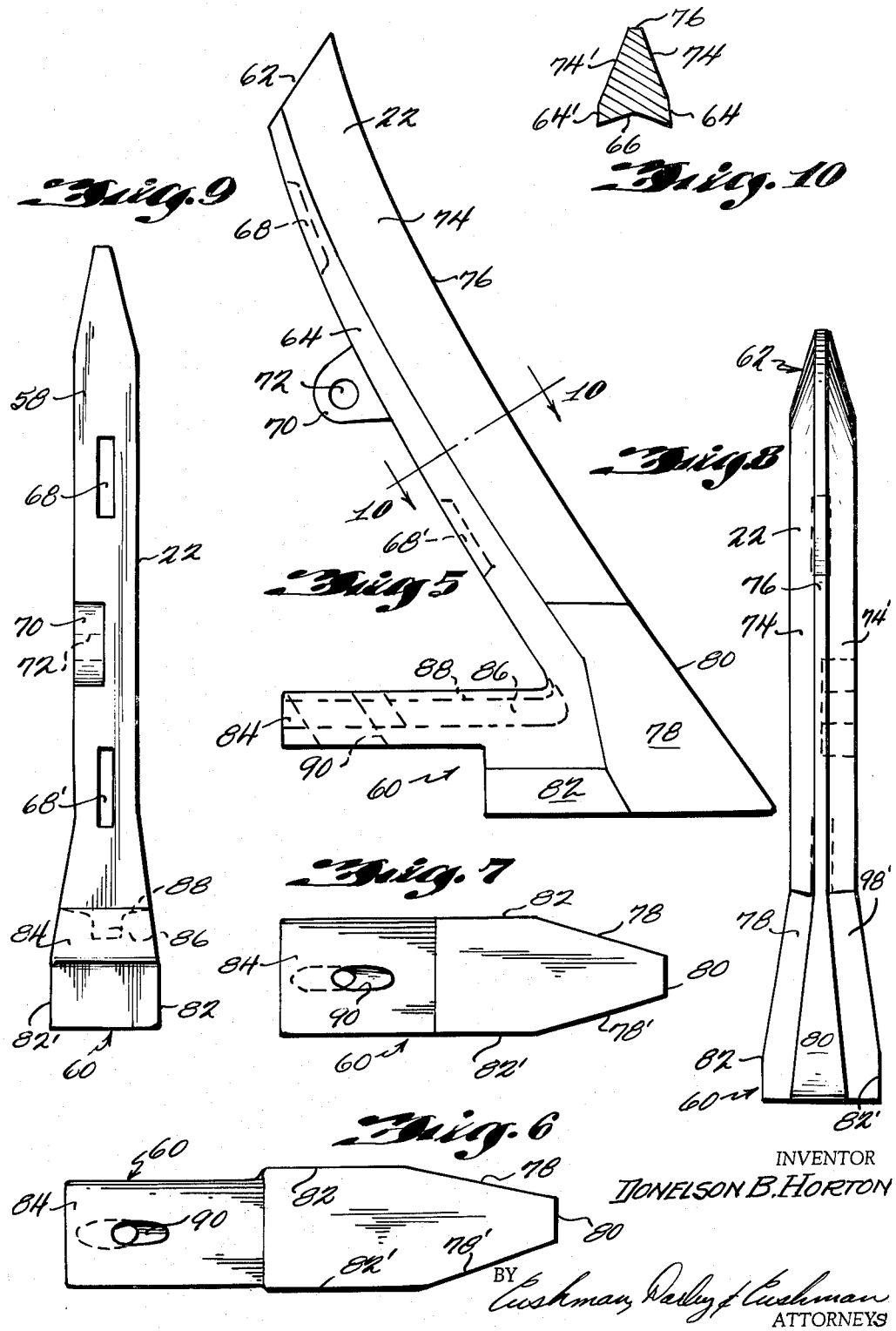

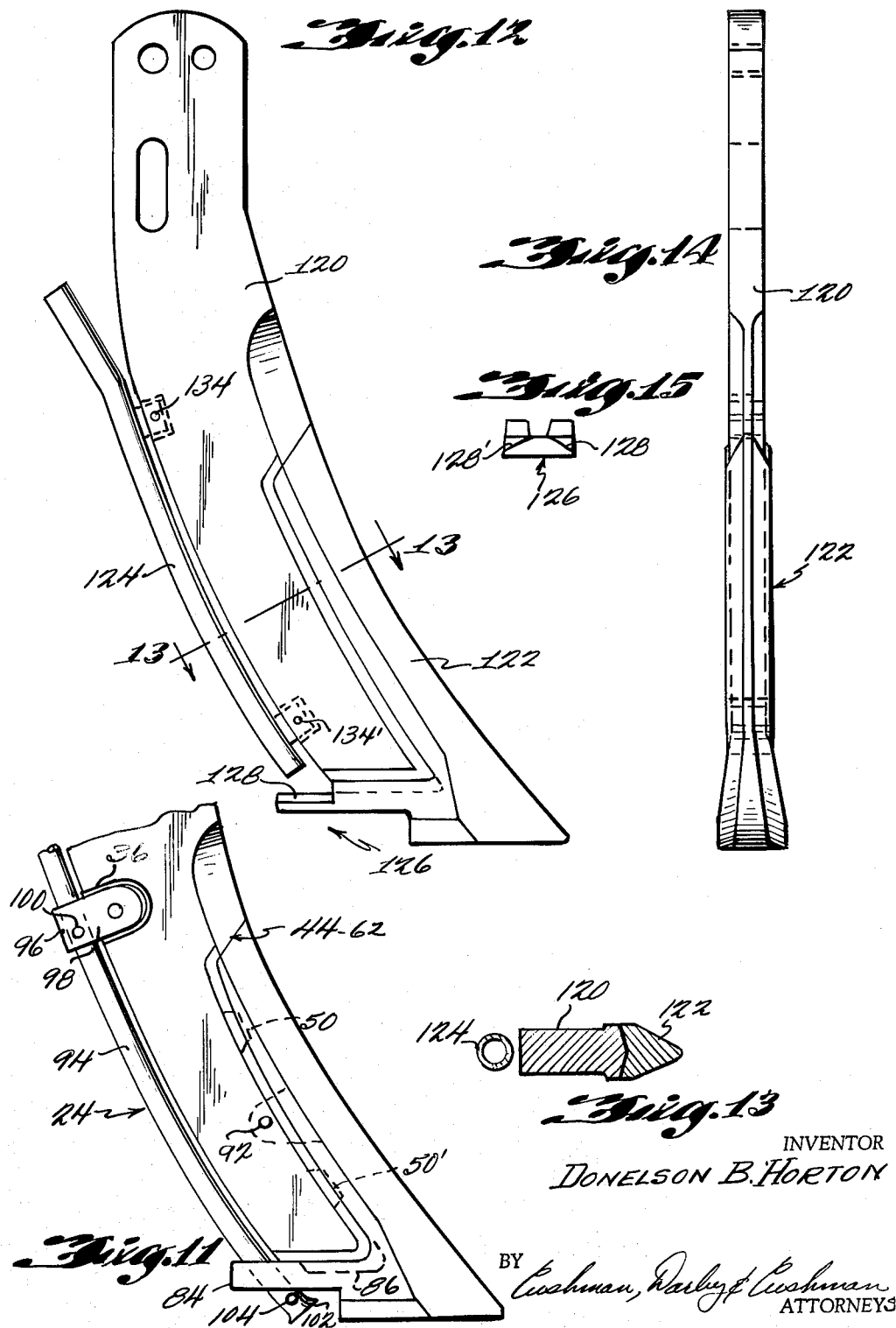

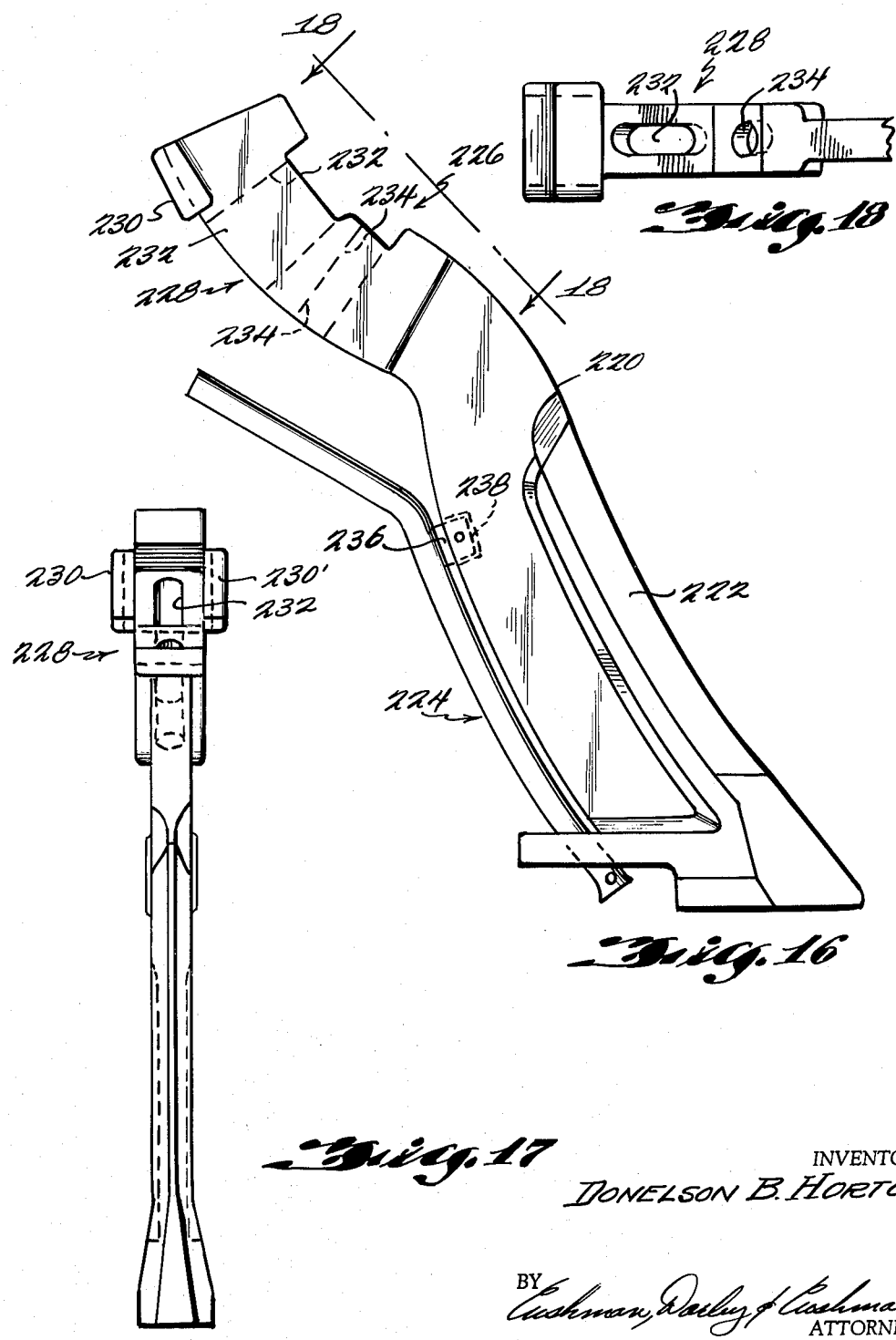

July 5, 1966  D. B. HORTON  3,259,087
FERTILIZER APPLICATOR BLADE

Filed Jan. 27, 1964  5 Sheets-Sheet 5

INVENTOR
DONELSON B. HORTON

BY
Cushman, Darby & Cushman
ATTORNEYS

United States Patent Office 3,259,087
Patented July 5, 1966

3,259,087
FERTILIZER APPLICATOR BLADE
Donelson B. Horton, c/o John Blue Co., Inc.,
Huntsville, Ala.
Filed Jan. 27, 1964, Ser. No. 340,312
6 Claims. (Cl. 111—7)

The present invention relates to replaceable parts for agricultural fertilizing equipment and more particularly to improvements in the art of supplying liquid fertilizers and other fluid treating agents to the subsoil by means of an improved applicator blade construction which permits replacement of the parts subject to wear.

In the past, it has been known to spray liquid fertilizer over the surface of the ground but this method has been found unsatisfactory because of evaporation and the fact that subsequent precipitation may wash away much of the remaining fertilizer. Surface spraying also resulted in a high concentration of fertilizer near the surface of the soil with relatively slow deep penetration. Agronomists more recently have found that deep placement of liquid fertilizers and other fluid treating agents is beneficial to plant growth, and earth penetrating tools or applicator blades have been devised for distributing liquid fertilizer in a desired impregnation pattern at various predetermined levels below the surface of the soil as the tools are drawn by a tractor.

Subsoil application has led to the use of newer and more efficient fertilizers and treating agents and has become particularly important for subsoil injection of volatile fluids such as anhydrous ammonia. Because of the volatile nature of these fluids, they must be placed below the surface of the soil, and must be covered with soil to prevent escape by evaporation. To this end, applicator blades have been devised which have a slender shank carrying a conduit for the fertilizer and which opens space for discharge of the fluid. The present invention relates to tools of this type.

Certain portions of these tools wear very rapidly while the main body of the tools still are in good condition. For example, the average applicator blade weighs about five pounds and it has been found, through many tests, that the blade becomes useless if it wears to the extent that a weight loss of three or four ounces is incurred around the forward wear-receiving portions. Thus wearing off of only three or four ounces of metal in critical parts of the applicator blade necessitates scrapping the entire assembly, or subjecting it to a tedious and expensive rebuilding job my means of welding, to restore the original configuration.

It is known in the art of agricultural implements to construct digging tools with replaceable parts in portions of the tool most subject to wear. For example, this type of construction has been used to deal with the wear which is experienced by plowshares and the like by corrosion and friction as they move through the soil, and further damage which often takes place when they strike rocks and other buried debris. It is clear that it would be desirable to apply the same principle to fertilizer applicator blades, since the portion which would have to be replaced periodically is relatively small and inexpensive in comparison to the entire implement.

There have in fact been many attempts to develop truly replaceable parts for liquid fertilizer applicator blades of the aforesaid type, since the introduction of anhydrous ammonia as an agricultural fertilizer. However, these have not been successful. One reason for this is the thickness of the blade which is very critical. That is, it has been necessary to make the blade thicker in order to anchor the replaceable wear parts to the main part of the blade. When a thicker blade is used to accommodate replaceable wear parts, it must be run at a greater depth to compensate for the increased disruption of the soil and to permit the desired covering of the fertilizer. The greater depth leads to increased wear and additional power is required to pull the thicker blade through the soil. Efforts have been made to replace only the tip of the blade, which avoids this problem, but these have not been satisfactory because the bottom four or five inches of the shank, which also are subject to wear, are not thereby protected. Thus, although a thin blade is more desirable, it has not been possible to construct a durable applicator with adequate replaceable wear parts without a thick blade.

In addition to these difficulties, others have arisen because it has been customary to weld the fertilizer tube to the blade, or to make it integral with the blade. When liquid ammonia which is quite cold is passed through the tube, the blade may be chilled severely. Particularly low temperatures are encountered when liquid ammonia is cooled as it evaporates during discharge, in some instances the blades have been known to freeze causing them to pick up layers of ice and frozen soil. Any such accumulations are objectionable because of increasing power requirements and the freezing tends to make the implement brittle and more easily subject to fracture.

Accordingly, it is a principal object of the present invention to overcome the aforesaid difficulties and provide an improved apparatus for the application of fluid fertilizing materials to the subsoil.

It is another object of the present invention to provide an attachment for tillage tools for distributing liquid fertilizer at predetermined levels below the surface of the ground by creating a horizontal void in the soil as an aid in dispersing the fertilizer.

It is a further object of this invention to provide an attachment for subsurface placement of liquid fertilizers in which parts subjected to severe wear are replaceable.

It is another object of this invention to provide an attachment for distributing liquid fertilizer in which the fertilizer is discharged into the soil in a desired impregnation pattern.

It is a still further object of this invention to provide a means of preventing damage and clogging of the discharge conduit of a subsoil fertilizer applicator.

Other and further objects and advantages of the present invention will become more apparent when reference is had to the accompanying disclosure and drawings in which:

FIGURE 1 is a side elevation of the body portion of an improved applicator blade according to the present invention;

FIGURE 2 is a front elevation of the body portion shown in FIGURE 1;

FIGURE 3 is a cross-sectional view taken along lines 3—3 of FIGURE 1;

FIGURE 4a is a cross-section along lines 4—4 of FIGURE 3;

FIGURE 4b is a cross-sectional view, corresponding to FIGURE 4a, of a modified embodiment;

FIGURE 5 is a side elevation on a somewhat enlarged scale of a removable boot unit suitable for attachment to the body portion shown in FIGURE 1;

FIGURE 6 is a bottom view of the removable boot unit of FIGURE 5;

FIGURE 7 is a bottom view of a modification of the removable boot unit of FIGURE 5;

FIGURE 8 is a front elevation of the removable boot unit of FIGURE 5;

FIGURE 9 is a rear elevation of the removable boot unit of FIGURE 5;

FIGURE 10 is a cross-section taken along lines 10—10 of FIGURE 5;

FIGURE 11 is a fragmentary side view of a part of the boot unit of FIGURE 5 assembled with the body portion of FIGURE 1;

FIGURE 12 is a side elevation of another embodiment of the applicator blade of the invention;

FIGURE 13 is a cross-section taken along lines 13—13 of FIGURE 12;

FIGURE 14 is a front elevation of the applicator blade assembly of FIGURE 12;

FIGURE 15 is a rear view of the heel portion of the replaceable boot unit of the embodiment shown in FIGURE 12;

FIGURE 16 is a side elevation of still another embodiment of applicator blade assembly according to the invention;

FIGURE 17 is a front elevation of the applicator blade assembly shown in FIGURE 16;

FIGURE 18 is a partial plan view taken from the reference plane 18—18 in FIGURE 16;

Figure 19:
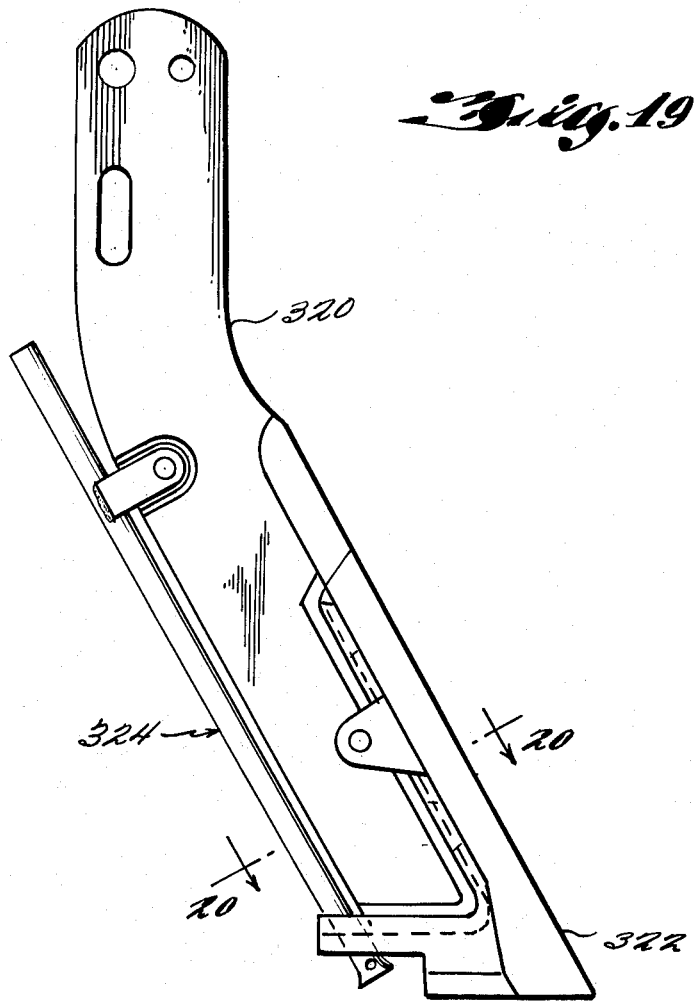
FIGURE 19 is a side elevation of yet another embodiment of applicator blade assembly in accordance with the invention.

Referring now to the embodiment of the invention illustrated in FIGURES 1–11, the applicator blade assembly comprises a body portion or shank 20, a replaceable boot 22 and a tube assembly 24. The shank 20 is preferably of unitary cast construction and is composed of an elongated arcuate body 26 formed, for example, of known constructional materials such as ductile iron and provided near its upper end with two round holes 28 and 30 and a slotted opening 32 for attachment by means of nuts and bolts to an adapter plate (not shown) fitted to the draw bar of a tractor, or for direct attachment by means of suitable nuts, bolts and/or clamps, etc. to the draw bar of a tractor or spring tine of a cultivating unit and may be mounted thereon in conventional manner, e.g., by bolts in two of the three openings.

As shown, the shank 20 is provided at its rear with a coupling indicated generally at 34 for connection with a clamping device of the tube assembly 24. In one embodiment, illustrated in FIGURE 1 and in cross section in FIGURE 4a, this coupling may comprise arcuate, or horseshoe-shaped ridges 36 and 36' and an opening 38 through the shank within the ridges, to receive a bolt or the like. In another embodiment illustrated in FIGURE 4b, the opening 38 may be eliminated. The latter construction may be used, for example, when the tube assembly 24 has friction clamps adapted to engage the ridges 36 and 36'.

Attention is now directed to the forward and lower right hand portions of the shank 20, as shown in FIGURE 1, and to the front elevation of FIGURE 2. The lower forward portion of the shank is recessed at 40 to receive the replaceable boot 22. Immediately above the recessed area, the sides of the boot are tapered forwardly and inwardly to form a nose portion 42 having a lower surface 44 which abuts the top of the replaceable boot. Below this, the forward edges of the shank are enlarged laterally in the form of ribs 46 and 46' (seen in cross-section in FIGURE 3) which extend downwardly to near the bottom of the shank and then rearwardly. The front 48 of the recessed area 40 of the shank is convex, being beveled inwardly and forwardly from ribs 46 and 46' to form a V-shaped surface which mates with a corresponding concave surface on the replaceable boot. At spaced points along front surface 48, there are two vertically-extending, elongated flanges 50 and 50'.

At the bottom of the shank, the lower surface tapers inwardly and downwardly from the ribs 46 and 46' to meet a depending rib or flange 52. These flanges prevent lateral movement between the shank and the replaceable boot. Intermediate the flanges 50 and 50' there is a slot or recess 54 in one side of the shank which opens to the front surface 40. A hole 56 is drilled laterally through the shank to meet this slot for a bolt or pin.

Turning now to FIGURES 5 through 10, which are on an enlarged scale from FIGURES 1 through 4b, the replaceable boot unit may be of cast construction and is preferably made from hardened ferrous material, e.g., heat treated ductile iron. The boot 22 is comprised of an upper leg portion 58 and a lower section indicated generally at 60. As will be appreciated from FIGURE 3, and FIGURE 13 hereinafter described, the boot 22 is somewhat thicker than the main part of the shank 20 and generally takes a thickness corresponding to the width of the front surface 48.

As shown, the leg portion 58 of the removable boot 22 is provided with an upper surface 62 which corresponds in shape to the surface 44 of the shank 20, flat sides 64 and 64' (as seen in FIGURE 10) and a V-shaped concave rear surface 66 which matches the front surface 48 of the shank. The rear surface 66 is recessed at 68 and 68' to receive the flanges 50 and 50'. At one side there is a rearwardly extending tongue 70 which fits into the slot 54 of the shank. The tongue has an opening 72 through it which aligns with the hole 56 to receive a suitable bolt or pin (as shown in FIGURE 11). The front of the boot is tapered inwardly and forwardly from the flat sides 64 and 64', across surfaces 74 and 74', to meet a front surface 76 which appears flat in cross-section but is seen to curve downwardly and forwardly in the side elevation of FIGURE 5. The surfaces 74 and 74' and 76 are continuations of the corresponding parts of the nose 42 and preferably are of hardened ferrous material for improved wearing qualities.

Attention is now directed to the lower portion 60 of the removable boot. In this area, the thickness of the unit increases from top to bottom, forming an enlarged toe, to dig a relatively wide trench for placement of liquid fertilizer. The tapering front surfaces 74 and 74' continue to the bottom of the unit across enlarged surfaces 78 and 78' which meet at the front surface 80. The latter is flat as seen in cross-section and a continuation of surface 76. The surface 80 increases in width from top to bottom corresponding to the increased thickness of the blade. The flat sides 64 and 64' also continue downwardly tapering outwardly and meeting lower flat side surfaces 82 and 82'. All surfaces 76–82 preferably are of hardened ferrous material for increased wear resistance.

Two configurations for the lower portion of the boot are illustrated in FIGURES 6 and 7, the embodiment of FIGURE 6 being advantageous in the use of a narrower rear portion. This permits the maximum mass to be concentrated in the frontal, wear-receiving portion. The greater thickness of the lower part of the unit increases its life, as it has been found that maximum wear is normally encountered here. The thickened lower portion of the unit also produces a relatively wide tunnel or channel beneath the soil for receiving the liquid fertilizer.

A heel 84 extends rearwardly along the lower section 60 of the boot unit for engagement with the bottom of the shank 20. The top of the heel is recessed to provide a slot 86 which receives the rib 52 and the upper edges of the slot are beveled at 88 to mate with the corresponding lower edges of the shank 20. There is an oblique opening 90 near the rear of the tongue to receive the fluid fertilizer tube, as will be described hereinafter.

In FIGURE 11, the shank 20 is shown assembled with the boot unit 22, by means of a bolt or pin 92 which fits through the holes 56 and 72. The flanges 50 and 50' which engage the recesses 68 and 68', and the shape of the mating surfaces, assure the secure attachment of the replaceable boot to the blade shank 20 even though only a single fastening member is used. The concave-convex relationship of the mating or abutting surfaces, upwardly along the shank, in association with the flanges 50 and 50', provide resistance to lateral and twisting movement between the shank and the boot unit. The concave-convex arrangement increases the area of contact without increasing the thickness of the applicator. This is desirable for the thin vertical portion of the boot unit which fits into the recessed front of the shank. As explained hitherto, it is quite important for an applicator blade to disturb the soil as little as possible above the trench where the liquid fertilizer is distributed, in order to prevent evaporation. It has been found difficult, in practice, to construct a replaceable boot unit which extends upwardly along the shank because of insufficient strength, unless the unit is made more thick. However, in accordance with the invention, this difficulty is overcome, in part by providing these means which minimize relative movement between the boot unit and the shank in this area.

Additional strength is provided by the contour of the boot unit and by matching it to that of the shank. In particular, it is important to have the portion of the shank which engages the boot unit, especially the vertical part of the joint, at least as thick as the corresponding part of the toe, and preferably of approximately the same thickness. This has the effect of limiting twisting which might be caused, e.g., when the toe of the unit strikes a rock.

The tube assembly 24 comprises a tube 94 and means for attaching it to the shank. As illustrated in FIGURE 11, the tube may be attached to the shank 20 by means of a U-clamp 96 and a bolt 98 although screws, pins or other disengageable fastening devices may be used. The U-clamp is connected to tube 94 by a rivet 100 or other fastening means such as shrink fittings, welding, soldering, brazing or integral molding. The bolt 98 fits in the opening 38 of the shank and the edges of the clamp 96 engage the ridges 36 and 36'.

The tube 94 passes through the oblique opening 90 of the rear portion of the boot unit. It is smaller than the opening to provide a loose fit. This construction, with the resultant lack of direct attachment between the tube and the shank, is more suitable in limiting heat transfer between them, thereby minimizing the tendency of the present blade to freeze. It also is possible to employ thermal insulation such as a plastic material between the tube and the other members to further restrict heat transfer. However, care must be exercised to assure that the insulation does not work loose when the applicator blade is used.

Although not entirely necessary in the embodiment shown, the tube 94 is provided with a flared lower end 102 for discharging the ammonia or other fluid material and may also be provided with a hole 104 drilled crossways in the tube to allow the anhydrous ammonia to escape.

FIGURES 12 through 15 show four views of a desirable modification according to the present invention having a shank or body portion 120, a removable boot unit 122 similar to those described above. There is also a fertilizer tube assembly 124 fastened by two couplings 134 and 134' of the same type as coupling 34. The rear portion of the boot, indicated generally at 126 is of different construction, however, to provide a deflector for the fertilizer. The upper edges of the heel are beveled inwardly and upwardly from the sides to form surfaces 128 and 128' immediately below the discharge opening of the tube assembly and these deflect the fertilizer laterally into the trench dug by the blade.

FIGURES 16 through 19 illustrate a third principal embodiment of similar construction to the embodiment of FIGURES 1-11. It comprises a shank 220, a replaceable boot unit 222 and a tube assembly 224, fitted together in a manner generally similar to that described above. The embodiment of FIGURES 16-18 differs however in the structure of the upper portion 226 of the shank which is adapted for direct attachment to the spring tine (not shown) of a tractor-drawn cultivator or fertilizing rig. As shown, the upper portion of the shank is composed of a thickened section indicated generally at 228 provided near its top with two lateral flanges 230 and 230', adapted to straddle a spring tine. For secure connection to such a spring tine, there are provided a slot 232 and a hole 234 for bolts or the like.

Also according to the embodiment of FIGURES 16-18, the fertilizing tube assembly 224 is attached to the shank 220 by a flange 236 which fits into a recess 238 cast into the shank. A bolt 240 passes through the shank and the flange to retain the flange in the recess.

Figure 20:
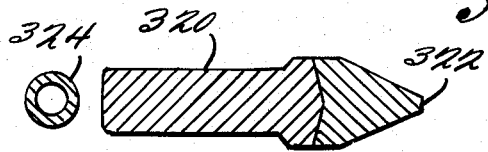
FIGURE 20 is a section along line 20—20 of FIGURE 19.

Another embodiment of the invention is illustrated in FIGURES 19 and 20. The applicator comprises a shank 320, a boot 322 and a tube assembly 324. All parts are of similar construction to the embodiment of FIGURES 1-11. However, the leading edges of the shank and boot are straight rather than arcuate, for use in soil where this contour is more suitable.

As indicated above, in use the applicator blade is attached to a tractor or similar traction means. As it is propelled across a field, the applicator blade is lowered into the soil to the desired depth to produce a furrow. A suitable valve is opened, e.g., after the blade is in the soil and a desired amount of the anhydrous ammonia or other chemical is delivered through the tube 94 to its discharge outlet for distribution within the covered furrow. As the blade moves on through the soil, the loosened soil will fall back into the furrow sealing the fertilizing material below. The blade may be quite thin (satisfactory blades may be made with a ½ inch thick shank and a boot which is ⅝ inch thick in its upper portions) except at its base. Only a very narrow opening is made near the surface of the soil and the tendency for volatile liquids to escape by evaporation is minimized. Nevertheless, the structural features described herein provide a secure mounting of the removable boot, particularly up along the shank, so that only a minimum of relative movement is permitted between it and the shank or body portion 20. As a result, an extremely thin construction is possible without sacrificing the necessary strength.

The present device has many uses in the treatment of the subsoil which, besides agricultural applications, may include repairing and building of semi-improved agricultural service roads by discharging heavy oils, chemicals or tar from the present conduit, followed by compaction of the soil surface when desired. Other uses include loosening soil for irrigation, discharge of pesticides, herbicides and fungicides, seed planting and discharging of solid fertilizers and other granular and powder materials such as lime, phosphate and organic fertilizers.

It will be appreciated that, while specific embodiments have been illustrated and described, changes may be made in the details of construction and mode of operation without departing from the scope of the invention, as this is defined in the appended claims.

What is claimed is:
1. An improved applicator blade assembly for distributing a liquid fertilizer below the surface of the soil as the blade is drawn through the soil which comprises: a shank having means for attachment to a traction device; conduit means associated with said shank for delivering fertilizer to below the surface of the soil; a removable boot abutting against the front of said shank; said boot having a heel portion extending rearwardly from the front thereof and below said shank, said heel portion abutting against the bottom of said shank; and means for fastening said boot and said heel to said shank, whereby said boot absorbs the substantial part of the wear of said applicator blade and may be replaced when worn to avoid discarding the entire applicator assembly, one of the abutting surfaces of said boot and said shank being convex and the other being concave so that the area of contact between said boot and said shank is greater than their cross-sectional area, whereby twisting movements between said shank and said boot are reduced without increasing their thickness; said conduit being fastened by disengageable coupling means to said shank such that the conduit is not in direct contact with other parts of the applicator blade, thereby minimizing heat transfer between the conduit and other members of the assembly to prevent undue chilling thereof and permitting replacement of said conduit if damaged, the rear portion of said heel having a relatively enlarged opening from top to bottom therethrough, said conduit means extending loosely through said opening such that said conduit means is essentially free floating therein.

2. An improved applicator blade assembly as set forth in claim 1 in which said convex and concave surfaces are V-shaped.

3. An improved applicator blade assembly as set forth in claim 1 in which the portion of said shank immediately adjacent its abutting surface is at least as thick as the portion of said boot immediately adjacent its abutting surface.

4. An improved applicator blade assembly as set forth in claim 1 including at least one upstanding flange on one of said abutting surfaces, the other of said abutting surfaces having a recess which receives said flange to limit lateral movement between said abutting surfaces.

5. An improved applicator blade assembly as set forth in claim 1 in which the upper part of said heel has a recess and said shank has a depending rib which is received in said recess to limit lateral movement between said heel and said shank.

6. An improved applicator blade assembly as set forth in claim 1 in which said boot is enlarged near the base thereof to dig a wide trench below a narrow one and provide additional mass in the portion of the applicator blade most subject to wear.

References Cited by the Examiner
UNITED STATES PATENTS

| | | | |
|---|---|---|---|
| 576,092 | 2/1897 | Conley | 172—753 |
| 1,564,083 | 12/1925 | Lyons | 111—86 |
| 2,082,283 | 6/1937 | Godfrey | 172—713 |
| 2,598,121 | 5/1952 | Hannibal | 111—7 |
| 2,842,077 | 7/1958 | Morrison | 111—7 |
| 2,843,066 | 7/1958 | Dugan | 111—7 |
| 2,988,026 | 6/1961 | Heckathorn | 111—7 |
| 3,092,052 | 7/1963 | Andersen | 111—7 |

ABRAHAM G. STONE, *Primary Examiner.*

W. A. SMITH, III, *Assistant Examiner.*